(12) United States Patent
Edwards et al.

(10) Patent No.: US 8,894,498 B2
(45) Date of Patent: Nov. 25, 2014

(54) IMAGING DEVICE, SYSTEM AND METHOD

(75) Inventors: Ross Edwards, Simi Valley, CA (US); Tim Linamen, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 342 days.

(21) Appl. No.: 12/837,004

(22) Filed: Jul. 15, 2010

(65) Prior Publication Data

US 2011/0151983 A1    Jun. 23, 2011

Related U.S. Application Data

(60) Provisional application No. 61/287,735, filed on Dec. 18, 2009.

(51) Int. Cl.
*A63G 31/16* (2006.01)
*G02B 27/22* (2006.01)
*G09F 19/12* (2006.01)
*A63G 31/00* (2006.01)

(52) U.S. Cl.
CPC ............ *G09F 19/12* (2013.01); *G02B 27/2221* (2013.01)
USPC .............................................. 472/61; 40/219

(58) Field of Classification Search
USPC ............... 472/59, 61, 63, 71, 72, 74, 81, 137; 40/219, 442, 443, 900
See application file for complete search history.

(56) References Cited

U.S. PATENT DOCUMENTS

| | | | | |
|---|---|---|---|---|
| 2,663,960 | A * | 12/1953 | Cerracchio | 40/427 |
| 3,462,213 | A * | 8/1969 | De Montebello | 352/86 |
| 4,085,932 | A * | 4/1978 | Hamano | 472/61 |
| 4,435,053 | A * | 3/1984 | Woloshuk et al. | 352/86 |
| 5,346,433 | A * | 9/1994 | Weinreich | 472/63 |
| 5,407,391 | A | 4/1995 | Monroe et al. | |
| 5,410,345 | A * | 4/1995 | Eichenlaub | 348/59 |
| 5,650,815 | A | 7/1997 | Dasso | |
| 5,782,698 | A * | 7/1998 | Keller | 472/61 |
| 5,871,404 | A * | 2/1999 | Weinreich | 472/63 |
| 6,168,531 | B1 * | 1/2001 | Adamson et al. | 472/61 |
| 6,190,019 | B1 * | 2/2001 | Hess | 362/125 |
| 6,857,963 | B1 * | 2/2005 | Suzuki | 472/63 |
| 6,929,552 | B1 * | 8/2005 | Hargabus | 472/61 |
| 2008/0129963 | A1 | 6/2008 | Hohl | |
| 2010/0058628 | A1 * | 3/2010 | Reid et al. | 40/219 |

FOREIGN PATENT DOCUMENTS

| | | |
|---|---|---|
| CN | 1400574 | 3/2003 |
| CN | 101090760 | 12/2007 |
| GB | 2340621 | 2/2000 |

(Continued)

OTHER PUBLICATIONS

Written Opinion of the International Searching Authority, Application No. PCT/US2010/045027, issued Jun. 19, 2012.

(Continued)

*Primary Examiner* — Kien Nguyen
(74) *Attorney, Agent, or Firm* — Fletcher Yoder, P.C.

(57) ABSTRACT

An image projecting device for producing a physiological illusion in a viewing guest, the device having a housing with a transparent projection surface, a strobe light supported by the housing and configured to illuminate the transparent projection surface, an image located on the transparent projection surface, and a controller configured to activate and set duration of the strobe light at a predetermined time to produce a physiological illusion of the image in the viewing guest.

27 Claims, 7 Drawing Sheets

(56) References Cited

FOREIGN PATENT DOCUMENTS

| | | |
|---|---|---|
| JP | 5040448 | 2/1993 |
| JP | 10171017 | 6/1998 |
| JP | 2000-172220 | 6/2000 |
| RU | 14355 U1 | 7/2000 |
| WO | 9406249 | 3/1994 |
| WO | 0023744 | 4/2000 |

OTHER PUBLICATIONS

Japanese Office Action for JP Application No. 2012-544489 issued Feb. 20, 2014.
Chinese Office Action for CN Application No. 201080064242.7 issued Mar. 4, 2014.
Russian Decision to Grant for Patent Application No. 2012130395 mailed Aug. 12, 2014.

* cited by examiner

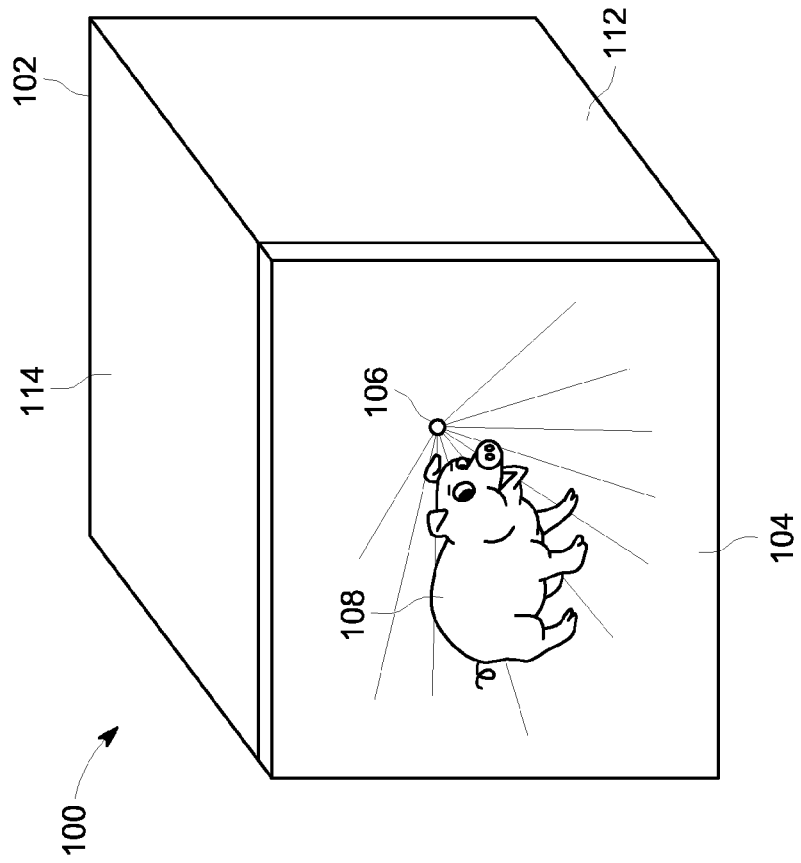
FIG. 1

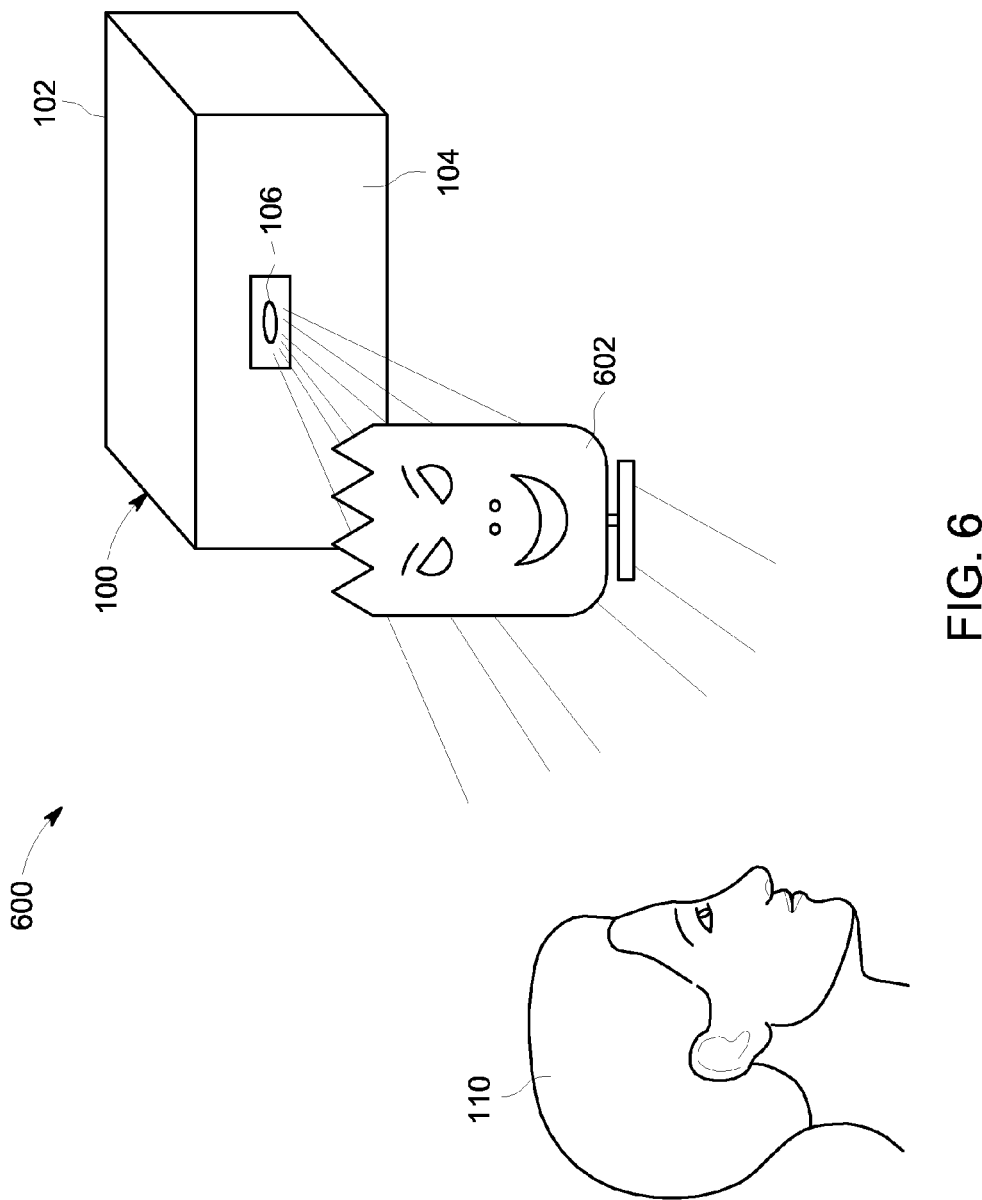

IMAGING DEVICE, SYSTEM AND METHOD

CROSS-REFERENCE TO RELATED APPLICATION

This application is related to and claims the benefit of U.S. Provisional Application No. 61/287.735, filed Dec. 18, 2009 and titled IMAGING DEVICE, SYSTEM AND METHOD which is hereby incorporated by reference in its entirety for all purposes.

BACKGROUND

The present invention relates to theme park attractions. More particularly, the present invention relates to a device, system and method for creating physiological illusions in a viewing guest.

Physiological illusions are effects on the eyes or brain of excessive stimulation of a specific type such as brightness, tilt, color, and movement. The theory is that stimuli have individual dedicated neural paths in the early stages of visual processing, and that repetitive stimulation of only one or a few channels causes a physiological imbalance that alters perception. Physiological illusions generally include afterimages following bright lights or adapting stimuli of excessively longer alternating patterns.

These physiological illusions are produced because an image is produced by the "patterned excitation" of the cones and rods in the retina. The excitation is processed by the neuronal system and various parts of the brain working in parallel to form a representation of the external environment in the brain. The cones respond to bright light and mediate high-resolution vision and color vision. The rods respond to dim light and mediate lower-resolution, black-and-white, and night vision. When light falls on a receptor it sends a proportional response synaptically to bipolar cells which in turn signal the retinal ganglion cells. The receptors are also 'cross-linked' by horizontal cells and amacrine cells, which modify the synaptic signal before the ganglion cells. Rod and cone signals are intermixed and combine, although rods are mostly active in very poorly lit conditions and saturate in broad daylight, while cones function in brighter lighting because they are not sensitive enough to work at very low light levels.

After-imaging, in particular, is an optical illusion that refers to an image continuing to appear in one's vision after the exposure to the original image has ceased. One of the most common afterimages is the bright glow that seems to float before one's eyes after staring at a light bulb or a headlight for a few seconds. The phenomenon of afterimages may be closely related to persistence of vision, which allows a rapid series of pictures to portray motion, which is the basis of animation and cinema.

After-images come in two forms, negative (inverted) and positive (retaining original color). Negative after-images are a retinal phenomenon and are well understood. Negative after-images are caused when the eye's photoreceptors, primarily those known as cone cells, adapt from the over stimulation and lose sensitivity. Normally the eye deals with this problem by rapidly moving the eye small amounts, the motion later being "filtered out" so it is not noticeable. However if the color image is large enough that the small movements are not enough to change the color under one area of the retina, those cones will eventually tire or adapt and stop responding. The rod cells can also be affected by this.

Positive afterimages are less understood. Generally, they appear the same color as the original image. They are often very brief, lasting less than half a second, and may not occur unless the stimulus is very bright. The cause of positive afterimages is not well known, but possibly reflects persisting activity in the visual system where the retinal photoreceptor cells continue to send neural impulses to the occipital lobe, suggesting that the experience of a stimulus can vary with the intensity of the stimulus. Only very bright stimuli produce positive afterimages, and a stimulus which elicits a positive image will usually trigger a negative afterimage quickly via the adaptation process.

Creating illusions in the art of theme parks are known. Illusions have been created using mirrors, molds, special glasses and lighting techniques. For example, U.S. Pat. No. 5,407,391 describes a negative bust illusion formed from a surface that presents a concave side to viewers to generate an illusion that the object always gazes at viewers as they move within an enlarged field of view. U.S. Pat. No. 5,650,815 describes a method and apparatus for creating an illusion of depth when viewing moving pictures projected on a plane surface. Glasses to worn by a viewer when viewing the moving pictures have the property of altering or distorting the real image projected. The disparity between the apparent images viewed by the two eyes creates an image disparity that is interpreted as a perception of depth. The glasses incorporate a lens for the dominant eye and a lens for the docile eye which narrows the image along the visual plane and the lens for the docile eye broadens the image along the visual plane. The lens for each eye is appropriately tinted to enhance the perception of depth. The glasses are reversible to enable placing the desired lens in front of the dominant and thus the docile eye.

However, past imaging devices do not create perceived images that are physiological in nature only, nor do past imaging devices and do not sufficiently utilize positive or negative after-imaging.

Accordingly, there is a desire for a device, system and method that produce a physiological illusion in a guest during a theme park attraction.

BRIEF DESCRIPTION

The present disclosure describes an image projecting device and method for producing a physiological illusion in a viewing guest device.

In an embodiment, an image projecting device for producing a physiological illusion in a viewing guest, the device comprising a housing comprising a transparent projection surface, a strobe light supported by the housing and configured to illuminate the transparent projection surface, an image located on the transparent projection surface, and a controller configured to activate and set duration of the strobe light at a predetermined time to produce a physiological illusion of the image in the viewing guest.

In accordance with another embodiment of the present invention, an image projecting device for producing a physiological illusion in a viewing guest, the device comprising a housing comprising a transparent projection surface, a strobe light supported by the housing and configured to illuminate the transparent projection surface, an image located on the transparent projection surface, and a controller configured to activate and set duration of the strobe light at a predetermined time to produce a physiological illusion of the image in the viewing guest, wherein the controller is further configured generate the image located on the transparent projection surface.

In accordance with another embodiment the invention provides a method for producing a physiological illusion in a viewing guest, the method comprising providing a projection device comprising a housing having a transparent projection surface and a strobe light supported by the housing, and an object interposed between said strobe and said transparent projection surface, producing the object silhouette on the transparent projection surface, activating the strobe when the guest is at a predetermined position and at a time when the guest is in a dark environment, producing a physiological illusion of the image in the viewing guest.

In accordance with another embodiment the invention provides a system for producing a physiological illusion in a viewing guest, the method comprising, a projection device comprising a housing, the housing having a transparent projection surface, a strobe light supported by the housing, and an opaque three dimensional object proximate the transparent projection surface, wherein the opaque three dimensional object defines a negative or positive space occupied by a two-dimensional image, and wherein the strobe is activated when the viewing guest is at a predetermined position and at a time when the viewing guest is in a dark environment to produce a physiological illusion of the image in the viewing guest.

Other features and advantages of the disclosure will become apparent by reference to the following description taken in connection with the accompanying drawings.

BRIEF DESCRIPTION OF THE DRAWINGS

Reference is now made briefly to the accompanying drawings, in which:

FIG. 1 is a perspective view of an image projecting device for producing a physiological illusion in a viewing guest.

FIG. 5b is a side view of the exemplary embodiment of FIG. 5a.

FIG. 6 is a perspective view of an image projecting system for producing a physiological illusion in a viewing guest in accordance with another embodiment of the present invention.

Like reference characters designate identical or corresponding components and units throughout the several views, which are not to scale unless otherwise indicated.

DETAILED DESCRIPTION

Figure 2:
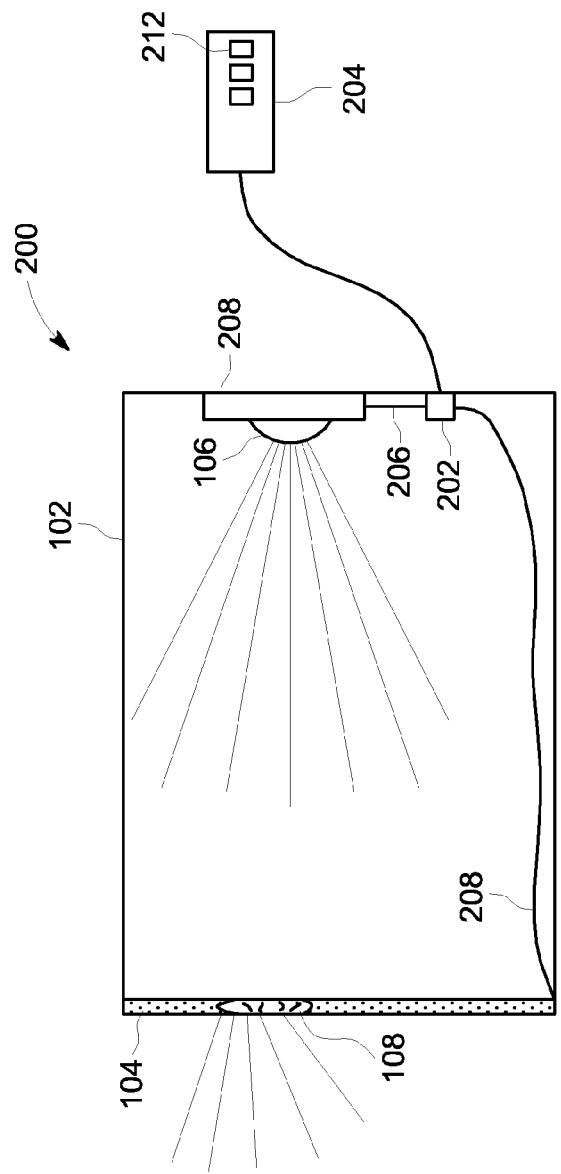
FIG. 2 is a side view of the image projecting device for producing a physiological illusion in a viewing guest of FIG. 1.

One embodiment of the present invention involves an image projecting device for producing a physiological in a viewing guest comprising a transparent projection surface and a strobe light configured to illuminate an image on the transparent projection surface. A particular advantages afforded by this invention is the ability to create a new experience for a guest and thus increase theme park attendance.

Specific configurations and arrangements of the claimed invention, discussed below with reference to the accompanying drawings, are for illustrative purposes only. Other configurations and arrangements that are within the purview of a skilled artisan can be made, used, or sold without departing from the spirit and scope of the appended claims. For example, while some embodiments of the invention are herein described with reference to theme park attractions, a skilled artisan will recognize that embodiments of the invention can be implemented in any setting in producing an illusory image is advantageous. For example, some non-limiting examples may include magic shows and arcade games.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

One embodiment of the present invention relates to image projecting device for producing a physiological illusion in a viewing guest. The device may be incorporated into rides or shows. For example, the device may be applicable to roller coasters in the dark, scramblers in the dark, or theme based rides having vehicles that reside on tracks, such as to take guests though a haunted house.

Referring now to FIG. 1, an imaging projecting device is shown generally at reference numeral 100. The image projecting device may include a housing 102 having a transparent projection surface 104, a strobe light (i.e., stroboscopic lamp) 106, and an image 108.

In an exemplary embodiment, the housing 102 is enclosed on all sides by left wall 112, top 114, back (not shown) and right wall (not shown). This way, the interior of the housing 102 is a light deficient environment with the exception of the transparent projection surface 104, the housing being configured to thereby concentrate light through the transparent projection surface when the strobe 106 is activated. The housing 102 may be constructed of any material suitably strong and durable such as plastic, steel or wood. The exterior of the housing 102 may comprise appropriate braces, brackets or notches (not shown) to secure the device 100 to a desired object. The interior of the housing 102 may also comprise appropriate braces, brackets or notches for attaching the strobe 106, which is supported by the housing 102.

The strobe light 106, or stereoscopic lamp as it may also be referred to, may be mounted or fixed to a back side of the interior of the housing 102, as shown in FIG. 2, or it may be mounted or fixed to a bottom panel of the interior of the housing 102. The strobe light 106 may be commercial strobe light having a flash energy of approximately 10 to 150 joules with a discharge time of approximately 2 or 3 milliseconds thereby creating powerful illumination. The strobe light may range in value from 50 watts to 800 watts or greater. The light source, as is known in the art, may be a xenon flash lamp. If colored lights are desirable, strobe specific gels may be used, as is known in the art. The strobe light 106 may be configured to activate at a predetermined time, when guest 110 is in viewing range.

With reference now to FIG. 2, a side view of the image projecting assembly of FIG. 1 is shown. In this embodiment, the imaging projecting device is shown generally at reference numeral 200. The image projecting device may include a housing 102 having a transparent projection surface 104, a strobe light 106, an image 108, a controller 202 and central processor 204.

The controller 202 may be configured to activate and set duration of the strobe light 106 at a predetermined time to produce a physiological illusion of the image in the viewing guest 110. In this regard, the controller may be an integrated circuit able to process command signals from a central processor 204. The controller 204 may be electrically connected to the strobe light 106 via line 206 through the stabilization block 208. The controller 202 may be further connected to the transparent projection surface 104 via line 208, the projection surface to be discussed in greater detail with relation to FIGS. 3a, 3b and 4. The controller 202 may also be electrically connected and in communication with the central processor 204 which may comprise a power source 212.

In an exemplary embodiment of the present invention, the controller 202 may be configured to activate the strobe 106 at a predetermined time. For example, if a guest 110 is on a ride vehicle on tracks (e.g., a rollercoaster in the dark), the central processor 204 may communicate ride vehicle position through a plurality of track or vehicle sensors which may also be in communication with the central processor 204. The central processor may then, at a predetermined time, send a command signal to the controller 202 which may activate the strobe light 106 when a guest is in the appropriate viewing position. Furthermore, the central processor 204 may send command signals to the controller 202 to control the duration of the strobe light 106. In this embodiment, duration of the strobe light 106 may correspond to ride vehicle speed. In the exemplary embodiment of a roller coaster in the dark, the speed of the vehicle may be relatively fast. Therefore, to produce the desired effect of a physiological illusion, the strobe duration may be relatively high when compared to an attraction in which the guest is moving into the projectors field of view at slower speeds.

Referring now to FIG. 3a, a more detailed side view of the image projecting assembly of FIGS. 1 and 2 is shown generally at reference numeral 300. Again, the image projecting device may include a housing 102 having a transparent projection surface 104, and strobe light 106. In this exemplary embodiment, the transparent projection surface 104 may comprise a first ply 302 and a second ply 304 to form a gap 306 for insertion of an imaging plate 308. Each of the plies 302 and 304 are transparent so as to allow maximum light penetration and to be free from obscurities or dimming. In this regard, the transparent projection surface 104 may be manufactured from a suitably strong and scratch resistant plastics or coated with abrasion resistant coating. By suitably strong, it is meant that the plies 302 and 304 must be durable enough to hold imaging plate 308 in gap 304 in a manner which prevents the plate 308 from shifting. The transparent projection surface also includes a stabilization member 310 to support the imaging plate 308.

With reference now to FIG. 3b, two exemplary imaging plates 312 and 314 are shown. Imaging plate 312 comprises a negative image 316. By "negative image" it is meant that the image itself is light transparent, while the rest of the imaging plate is light resistant. A negative imaging plate such as 312 concentrates light from the strobe 106 to produce a physiological illusion on the retina of a viewing guest. In contrast, the imaging plate 314 comprises a positive image 318. By "positive image" it is meant that the entire imaging plate is transparent with the exception of a silhouette of the image. The imaging plates 312 and 314, like the transparent projection surface, may be manufactured from a suitably strong and scratch resistant plastic or coated with abrasion resistant coating.

In an alternative embodiment of the present invention, the transparent projection surface 104 may comprise an opaque inverse cutout of an object, held in place by a vice (not shown) at a lower portion of the cutout.

While as shown, the images on imaging plates 312 and 314 is a pig, the image may also comprise a deer, a human face, a tree, a building, or any desirable object corresponding to a theme of a ride for use with the present invention. For example, if it is meant to frighten, in a haunted house setting, the image may comprise a forbidding creature such as a murderous clown or a ghoul. In this way, the image may be changeable by an operator, by for example, sliding different plates of the plurality of plates between the plies. Alternatively, the plates may be changed automatically by a slide real. Furthermore, the image may be etched or painted on the imaging plates 312 and 314 by known techniques.

Figure 3:
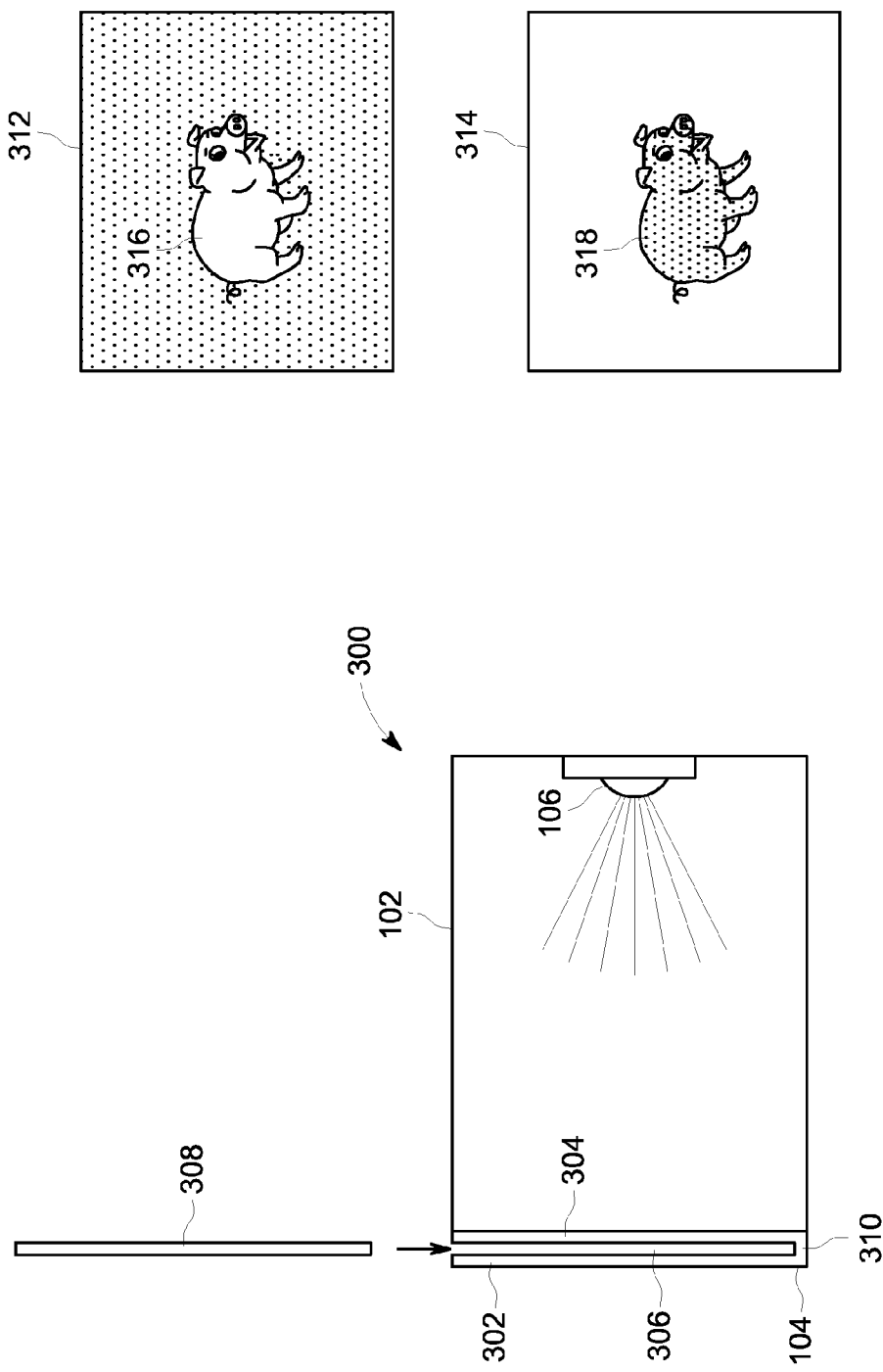
FIG. 3a is a side view of the exemplary embodiment of the image projecting device of FIGS. 1 and 2.
FIG. 3b is a front view of a negative and positive imaging plate.
Figure 4:
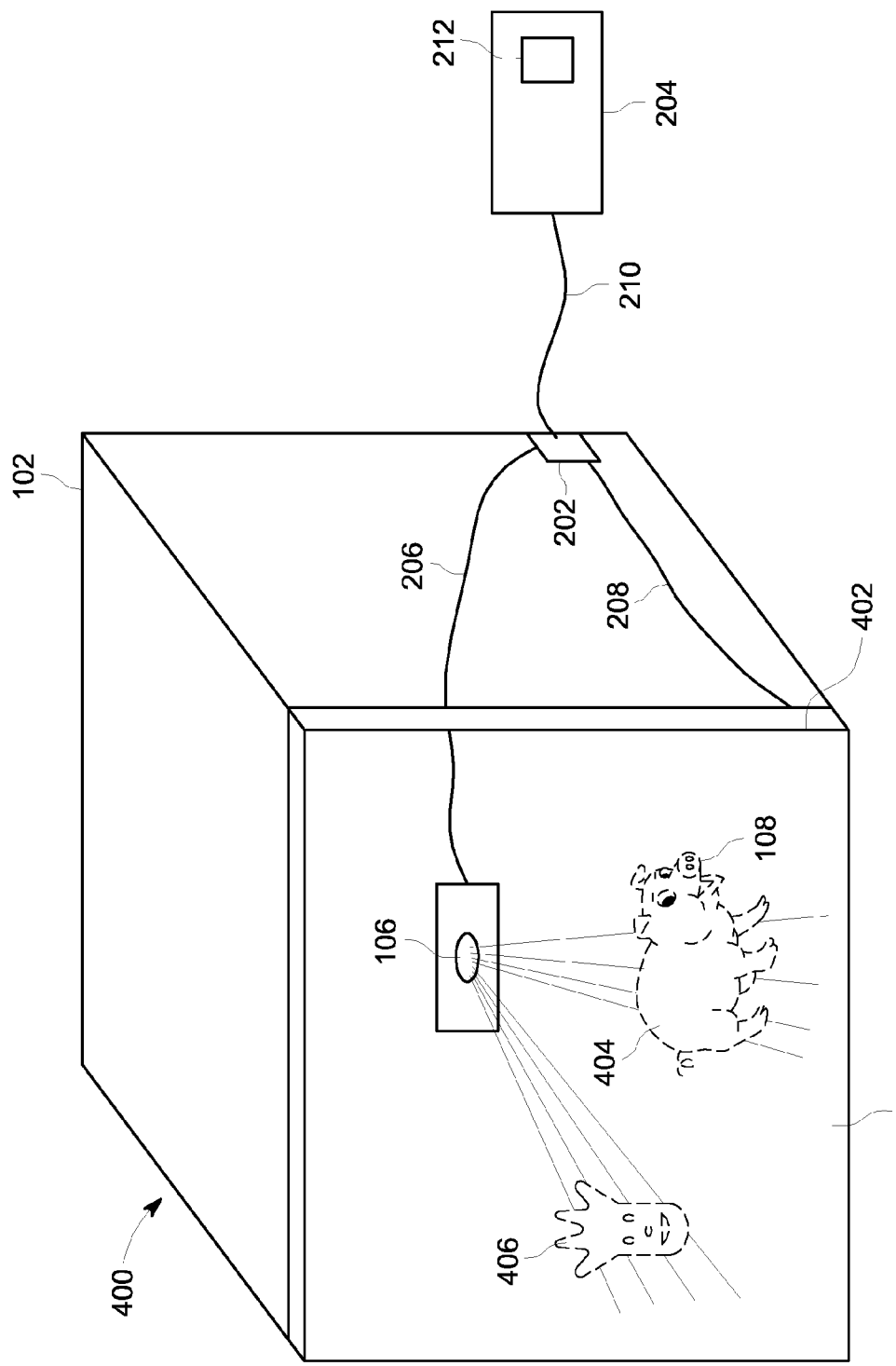
FIG. 4 is a perspective view of an image projecting device in accordance with another embodiment of the present invention.

In another alternative embodiment of the present invention, the translucent projection surface may comprise a transparent LCD monitor. Referring now to FIG. 4, a perspective view of the image projection assembly in FIGS. 1-3 is shown at reference numeral 400. Like the device shown in FIG. 1, the projection assembly comprises a housing 102 having a transparent projection surface 104, a strobe light (i.e., stroboscopic lamp) 106, and an image 108. However, rather than the transparent projection surface described with reference to FIG. 3a, an LCD monitor 402 functions as the transparent projection surface 106. In this way, the LCD may be configured so as to not allow light to penetrate the screen, except in a shape corresponding to a desired object. As shown, the controller 202 may be electrically connected to the strobe light 106 via line 206. The controller 202 may be further connected to the transparent projection surface 104 via lines 208. The controller 202 may also be electrically connected and in communication with the central processor 204 which may comprise a power source 212. As discussed with regard to FIG. 2, the controller 202 may be configured to activate the strobe light 106 at a predetermined time. However, the controller 202 may also be configured to automatically generate the image 402 located on the LCD screen when prompted by the central processor 204. The central processor 204 may then, at a predetermined time, send a command signal to the controller 202 which may activate the strobe light 106 when the desired image is displayed. In this regard, a guest who is in a stationary ride may enjoy a plurality of different images through the use of only one image projecting device 400. For example, if a guest 110 is enjoying a show, the device may be incorporated into the show at predetermined intervals. For example, in the context of a motion simulator, the central processor 204 may communicate with the controller and at a predetermined time display a first image. Then, later in the ride, the central processor may send a different command to the processor to display a second image, and so on.

The images displayed on the LCD monitor 402 may, as discussed with regard to FIG. 3b, be positive or negative images. The LCD monitor 402 may be an electronically modulated optical monitor with monochrome pixels that may, when activated allow or disallow the light from the strobe 106 to pass through its face. For example, if the image is to be negative, the pixels would active as black except for the shape of he area 404 or 406 to produce the image. If the image positive, the pixels would form only the silhouettes of images 404 or 406. The strobe 106 will then activate a corresponding time to thereby produce a physiological illusion to a guest.

The guest may be in dark or dimly lit environment when the projecting device is activated. If a guest, either stationary viewing or passing by, is subject to the strobe flashing through or around on image, once the image disappears in reality, it will still be viewable by the guest as an "after-image". When the strobe 106 flashes, the cones and rods of the retina become stimulated. Because the strobe may flash at a speed of one flash per three milliseconds at least, cone cells adapt from the over stimulation and lose sensitivity thus producing an after image. A positive after-image may also be produced by the strobe because after the image flashes, the guest remains in a dark area. The guest should see a fading positive afterimage, likely followed by a negative afterimage that may last longer.

Figure 5B:
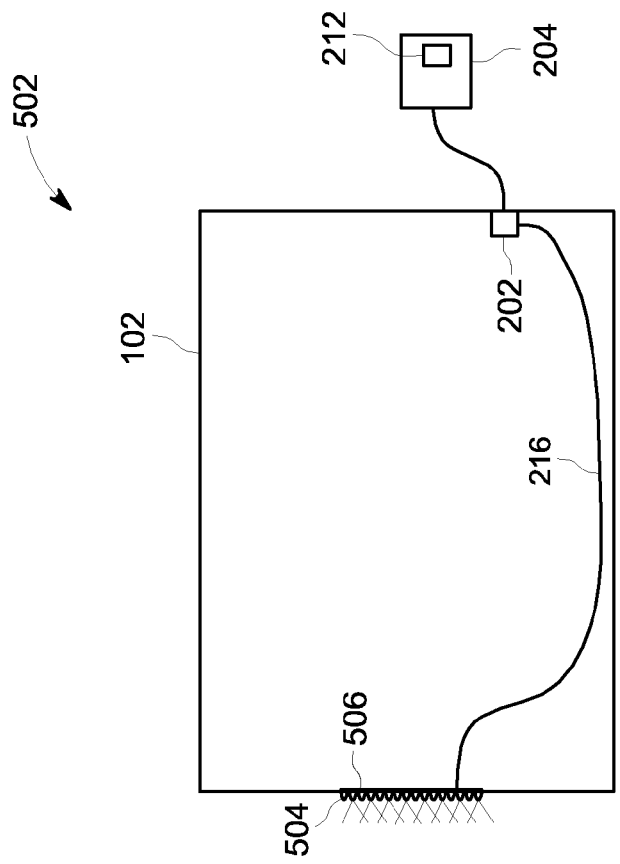
Figure 5A:
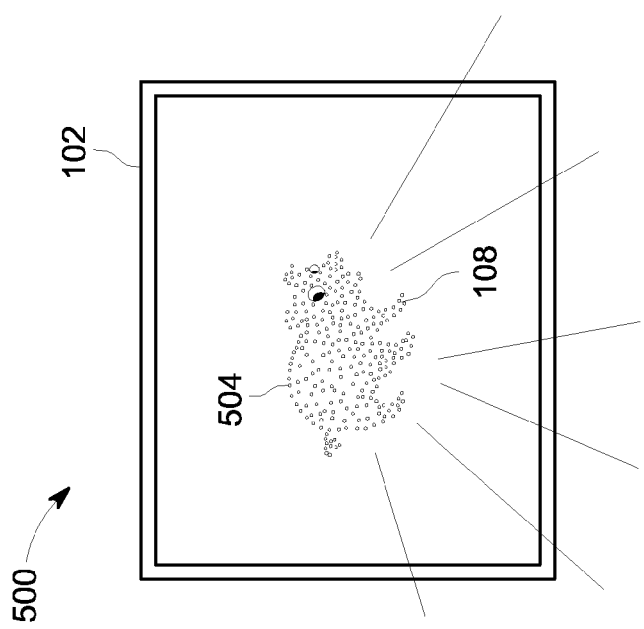
FIG. 5a is a front view of an image projecting device for producing a physiological illusion in a viewing guest in accordance with another embodiment of the present invention.

Now with reference to FIG. 5*a*, another alternative embodiment of the present invention is shown at 500. In this embodiment, the strobe may comprise an array of ultra-bright light emitting diodes (hereinafter "LEDs") 504 configured in a desirable shapes or patterns such as those described above. In this exemplary embodiment, LEDs 504 applicable in the present invention may include a size of 2-10 mm. The LEDs 504 may be connected to a controller 202, which may be configured to activate and set duration of the strobe light 106 at a predetermined time to produce a physiological illusion of the image in the viewing guest. The controller 204 may be electrically connected to the array of LEDs 504 via line 206 through the circuit board 506. The controller 202 may be further connected to the transparent projection surface 104 via line 208. The controller 202 may also be electrically connected to and in communication with the central processor 204 which may comprise a power source 212.

In an exemplary embodiment of the present invention, the controller 202 may be configured to activate the array of light emitting diodes 504 at a predetermined time. For example, if a guest 110 is on a ride vehicle on tracks (e.g., a rollercoaster in the dark), the central processor 204 may communicate ride vehicle position through a plurality of track or vehicle sensors which may also be in communication with the central processor 204. The central processor may then, at a predetermined time, send a command signal to the controller 202 which may activate the array of light emitting diodes 504 when a guest is in the appropriate viewing position. Furthermore, the central processor 204 may send command signals to the controller 202 to control the duration and which LEDs on the screen may become lit. In this embodiment, duration of the strobe light 106 may correspond to ride vehicle speed. In the exemplary embodiment of a roller coaster in the dark, the speed of the vehicle may be relatively fast. Therefore, to produce the desired effect of a physiological illusion, the LED duration may be relatively high when compared to an attraction in which the guest is moving into the projectors field of view at slower speeds.

Referring now to FIG. 6, in another embodiment of the present invention, a system for producing a physiological illusion in a viewing guest is provided at 600. The system may comprise a projection device 100 having a housing 102, the housing 102 having a transparent projection surface 104, a strobe light 106 supported by the housing 102; and an opaque object 602 proximate the transparent projection surface; wherein the opaque object 602 defines a negative or positive space occupied by a two-dimensional image, and wherein the strobe 106 is activated when the viewing guest 110 is at a predetermined position and at a time when the viewing guest is in a dark environment to produce a physiological illusion of the image in the viewing guest.

As shown, the opaque object 602 comprises an opaque mask, and is located directly adjacent and between the transparent projection surface and the strobe 106. However, other objects such as animals and trees can be used may be used.

Figure 7:
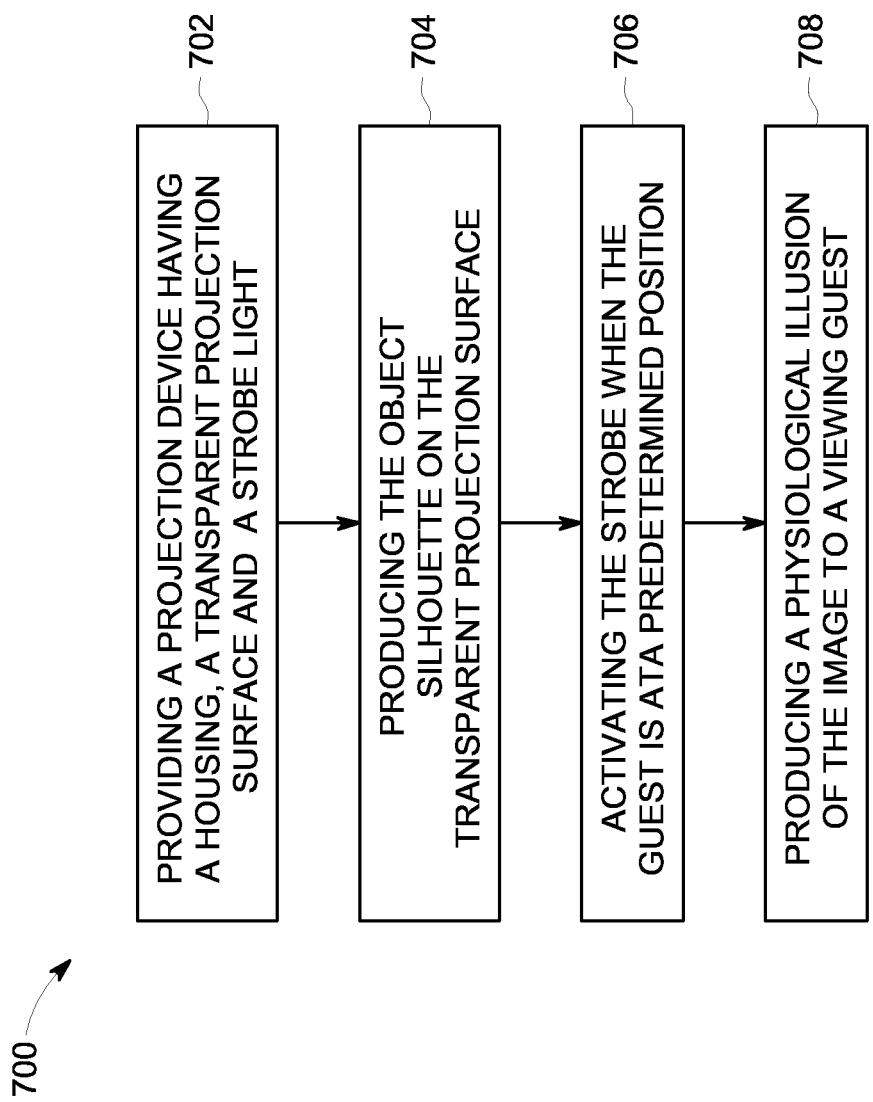
FIG. 7 is a flow-chart describing a step-wise method in accordance with a further embodiment of the present invention.

Referring now to FIG. 7, there is shown a flow chart to better help illustrate a method for producing a physiological illusion in a viewing guest is provided generally at 700. While the flowchart shows an exemplary step-by-step method, it is to be appreciated that a skilled artisan may rearrange or reorder the steps while maintaining like results.

Providing a projection device comprising a housing having a transparent projection surface and a strobe light supported by the housing step 702 comprises providing a projection device such as one described with reference to FIGS. 1-5. The transparent surface may comprise two clear plies and an imaging plate as shown in FIG. 3*a*, or, in the alternative, an LCD monitor as discussed with regard to FIG. 4.

Producing a projection the object silhouette on the translucent projection surface step 704 may comprise sliding an imaging plate into a gap between the two plies of the transparent projection surface, or in the alternative, the images may be generated by the LCD monitor through signals from the controller. If imaging plates are to be used, an operator may be utilized to change the plates when different images are desired. The plates may also be changed automatically by a instrument functioning as a slide real. Furthermore, an opaque object may be used as the image.

Activating the strobe when the guest is at a predetermined position step 706 may comprise signaling the controller to activate the strobe. For example, if a guest 110 is on a ride vehicle on tracks (e.g., a rollercoaster in the dark), the central processor 204 may communicate ride vehicle position through a plurality of track or vehicle sensors which may also be in communication with the central processor 204. The central processor may then, at a predetermined time, send a command signal to the controller 202 which may activate the strobe light 106. Furthermore, the central processor 204 may send command signals to the controller 202 to control the duration of the strobe light 106. In this embodiment, duration of the strobe light 106 may correspond to ride vehicle speed. In the exemplary embodiment of a roller coaster in the dark, the speed of the vehicle may be relatively fast. Therefore, to produce the desired effect of a physiological illusion, the strobe duration may be relatively high when compared to an attraction in which the guest is moving into the projectors field of view at slower speeds. Producing a physiological illusion of the image to a viewing guest stop 708 may then occur.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An image projecting device for producing a physiological illusion for a viewing guest, the device comprising:
   a housing comprising a transparent projection surface;
   a stroboscopic lamp supported by the housing and configured to illuminate the transparent projection surface with a flash of light;
   an image located on the transparent projection surface; and a controller configured to activate the stroboscopic lamp to produce a physiological illusion of the image for the viewing guest when an amusement ride vehicle is in a particular position.

2. The device of claim 1, comprising an imaging plate, wherein the transparent projection surface comprises two separate plies forming a gap configured to receive the imaging plate.

3. The device of claim 2, wherein the imaging plate is automatically changeable.

4. The device of claim 2, wherein the imaging plate is manually changeable by an operator.

5. The device of claim 1, comprising a plurality of imaging plates inserted between two separate plies of the transparent projection surface, each of the plurality of imaging plates having a different image located thereon.

6. The device of claim 5, wherein the imaging plates comprise a positive object having a solid silhouette outline.

7. The device of claim 5, wherein the imaging plates comprise a negative object having a transparent silhouette outline.

8. The device of claim 1, wherein the stroboscopic lamp comprises a plurality of light emitting diodes.

9. The device of claim 8, wherein the plurality of light emitting diodes is an array of light emitting diodes forming an image.

10. The device of claim 1, wherein the flash of light comprises an energy of approximately 10 to 150 joules and a discharge time of approximately 2 to 3 milliseconds.

11. The device of claim 1, wherein the housing comprises a plurality of sides configured to direct the flash of light toward the transparent projection surface.

12. The device of claim 1, wherein the particular position is detected by a sensor positioned on a path traveled by the amusement ride vehicle.

13. An image projecting device for producing a physiological illusion for a viewing guest, the device comprising:
    a housing comprising a transparent projection surface;
    a stroboscopic lamp supported by the housing and configured to illuminate the transparent projection surface with a flash of light;
    an image located on the transparent projection surface; and
    a controller configured to activate the stroboscopic lamp at a predetermined time to produce a physiological illusion of the image for the viewing guest, wherein the predetermined time is when an amusement ride vehicle guiding the viewing guest is at a particular position.

14. The device of claim 13, wherein the controller is further configured to provide a signal to a display that, in turn, generates the image.

15. The device of claim 13, wherein the image comprises at least one of a silhouette and an outline.

16. The device of claim 13, wherein the controller comprises a microprocessor configured to alter the image at predetermined intervals.

17. The device of claim 13, wherein the transparent projection surface is an transparent LCD screen and the image is defined by liquid crystals of the LCD screen.

18. The device of claim 13, wherein the stroboscopic lamp comprises a plurality of light emitting diodes.

19. The device of claim 18, wherein the plurality of light emitting diodes is an array of light emitting diodes forming an image.

20. The device of claim 13, wherein the particular position is detected by a sensor positioned on a path traveled by the amusement ride vehicle.

21. A method for producing a physiological illusion for a viewing guest, the method comprising:
    producing an object silhouette on a transparent projection surface of a housing with a stroboscopic lamp supported by the housing;
    guiding the viewing guest to a predetermined position with an amusement ride vehicle;
    activating the stroboscopic lamp when the guest is at the predetermined position as determined by a sensor positioned on a path traveled by the amusement ride vehicle and at a time when the guest is in a dark environment as determined by the sensor positioned on the path traveled by the amusement ride vehicle;
    producing a physiological illusion of the object silhouette for the viewing guest with a flash of light generated by the stroboscopic lamp.

22. The method of claim 21, further comprising producing a second object silhouette on the transparent projection surface and repeating the activating and producing steps.

23. The method of claim 21 wherein producing the object silhouette comprises controlling the object silhouette with a microprocessor, the microprocessor configured to alter the image silhouette at known intervals.

24. The method of claim 21, wherein the image is produced on a transparent LCD screen.

25. The method of claim 21, wherein the stroboscopic lamp comprises a plurality of light emitting diodes.

26. The method of claim 25, wherein the plurality of light emitting diodes comprises an array of light emitting diodes forming an image.

27. A system for producing a physiological illusion for a viewing guest, the system comprising:
    a projection device comprising a housing, the housing having a transparent projection surface;
    a stroboscopic lamp supported by the housing;
    an opaque three dimensional object proximate the transparent projection surface; and
    a controller configured to activate the stroboscopic lamp to produce a flash of light when the viewing guest is at a predetermined position and at a time when the viewing guest is in a dark environment, as detected by a sensor positioned on a path traveled by an amusement ride vehicle guiding the viewing guest, to produce a physiological illusion of the image for the viewing guest, wherein the time is when the amusement ride vehicle guiding the viewing guest is at the predetermined position,
    wherein the opaque three dimensional object defines a positive space occupied by a two-dimensional image.

* * * * *